United States Patent
Yamaura et al.

(10) Patent No.: US 6,192,372 B1
(45) Date of Patent: Feb. 20, 2001

(54) DATA SELECTING APPARATUS WITH MERGING AND SORTING OF INTERNAL AND EXTERNAL DATA

(75) Inventors: Atsushi Yamaura; Satoshi Suzuki, both of Hamamatsu (JP)

(73) Assignee: Yamaha Corporation, Hamamatsu (JP)

( * ) Notice: Under 35 U.S.C. 154(b), the term of this patent shall be extended for 0 days.

(21) Appl. No.: 09/026,876

(22) Filed: Feb. 19, 1998

(30) Foreign Application Priority Data

Feb. 28, 1997 (JP) .................................................. 9-046545

(51) Int. Cl.⁷ .................................................. G06F 17/00
(52) U.S. Cl. .................. 707/104; 707/1; 707/2; 707/3; 707/203
(58) Field of Search ............................. 707/1, 2, 3, 104; 348/203, 6; 369/1, 13, 14, 32; 84/609; 235/381; 705/27, 32; 380/5; 395/500.34, 710; 379/202

(56) References Cited

U.S. PATENT DOCUMENTS

| | | | |
|---|---|---|---|
| 5,386,568 | * 1/1995 | Wold | 395/500.34 |
| 5,682,360 | * 10/1997 | Oshima | 369/32 |
| 5,690,496 | * 11/1997 | Kennedy | 434/307 |
| 5,784,095 | * 7/1998 | Robbins | 348/6 |
| 5,920,535 | * 7/1999 | Hisamatsu | 369/83 |

FOREIGN PATENT DOCUMENTS 5-134662  5/1993  (JP).

* cited by examiner

Primary Examiner—Thomas G. Black
Assistant Examiner—Diane D. Mizrahi
(74) Attorney, Agent, or Firm—Morrison & Foerster

(57) ABSTRACT

A data select apparatus is constructed for selecting a desired data item. In the apparatus, an internal memory device memorizes a first set of data items. A peripheral device is provided for accessing an external memory medium. A detector device presents a detection signal when the peripheral device receives the external memory medium for accessing and when the received external memory medium stores a second set of data items upon accessing. A controller device responds to the detection signal for merging the first set of data items retrieved from the internal memory device and the second set of data items retrieved from the external memory medium with each other and for sorting the merged data items in a predetermined order. A display device operates upon presence of the detection signal for displaying both of the first and second sets of the data items in the predetermined order, and operates upon absence of the detection signal for displaying only the first set of data items. A keyboard device is operated to select a desired data item from the displayed data items.

18 Claims, 16 Drawing Sheets

FIG.6

| SONG CODE (IN abc) | SONG TITLE | ARTIST CODE | COMPOSER CODE | GENRE CODE | STYLE CODE | TIMBRE CODE | TEMPO VALUE | HARMONY CODE |
|---|---|---|---|---|---|---|---|---|
| 1 | AAAA | 35 | 5 | 22 | 10 | 1 | 150 | 2 |
| 2 | AAAB | 1 | 25 | 3 | 26 | 58 | 80 | 0 |
| 3 | BBBB | 18 | 32 | 11 | 10 | 36 | 110 | 4 |
| ... | ... | ... | ... | ... | ... | ... | ... | ... |
| 400 | ZZZZ | 67 | 3 | 19 | 62 | 1 | 75 | 5 |

FIG.7(A)

ARTIST TABLE

| ARTIST CODE | ARTIST NAME |
|---|---|
| 1 | Aaaa |
| 2 | Aabb |
| 3 | Bbbb |
| ⋮ | ⋮ |
| 80 | Zzzz |

FIG.7(B)

COMPOSER TABLE

| COMPOSER CODE | COMPOSER NAME |
|---|---|
| 1 | aaaa |
| 2 | aabb |
| 3 | bbaa |
| ⋮ | ⋮ |
| 62 | zzzz |

FIG.7(C)

GENRE TABLE

| GENRE CODE | GENRE NAME |
|---|---|
| 1 | Rock |
| 2 | Pops |
| 3 | Dance |
| ⋮ | ⋮ |
| 40 | Enka |

SORT TABLE

| SORT ORDER | SONG CODE | SONG TITLE |
|---|---|---|
| 1 | 4 | ... |
| 2 | 16 | ... |
| 3 | 38 | ... |
| ⋮ | ⋮ | ⋮ |
| N | M | ... |

SORT TABLE

| SORT ORDER | STYLE CODE | SONG CODE | SONG CODE IN STYLE | SONG TITLE |
|---|---|---|---|---|
| 1 | 23 | | 1 | ... |
| 2 | 5 | | 3 | ... |
| 3 | 12 | | 4 | ... |
| ... | ... | | ... | ... |
| N | 68 | | 2 | ... |

DATA SELECTING APPARATUS WITH MERGING AND SORTING OF INTERNAL AND EXTERNAL DATA

BACKGROUND OF THE INVENTION

1. Field of the Invention

The present invention generally relates to a data selecting apparatus and, more particularly, to a data selecting apparatus for selecting a desired data item from sets of data items stored in an internal memory device and an external memory medium.

2. Description of Related Art

A data selecting apparatus is provided for selecting music performance configuration data in an automatic accompaniment apparatus, for example. Using the data selecting apparatus, a user can select music performance configuration data necessary for setting automatic accompaniment. The music performance configuration data is a combination of performance style, timbre, tempo, and harmony necessary for configuring or setting the automatic accompaniment. The music performance configuration data is normally stored in an internal memory device of the automatic accompaniment apparatus. The user can select a desired data item from plural items of music performance configuration data stored in the internal memory device. Additional music performance configuration data items are sometimes provided by means of an external memory medium such as a floppy disk. In this case, the music performance configuration data selecting apparatus can select a desired item of the music performance configuration data stored in the external memory medium in addition to the data stored in the internal memory device. For example, to select the desired data item stored in the floppy disk, the data selecting apparatus is placed into a disk access mode, in which the data selecting apparatus selects the desired data item from the floppy disk and loads the selected data item into the internal memory device.

Selection of data from the floppy disk requires the user to perform operation of selecting the disk access mode. This makes cumbersome the operation of the music performance configuration data selecting apparatus. The user may also encounter a situation in which he or she does not know which of the internal memory device and the floppy disk stores the desired data item. In such a situation, the user first searches the internal memory device for the desired item of the performance configuration data. If the desired data item is not found in the internal memory device, the user must search the floppy disk. Thus, the procedure of operating the conventional music performance configuration data selecting apparatus is complicated, degrading ease-of-operation.

SUMMARY OF THE INVENTION

It is therefore an object of the present invention to provide a data selecting apparatus capable of efficiently selecting a desired data item from a set of data items stored in an internal memory device or an external memory medium.

In carrying out the invention and according to one aspect thereof, there is provided a data selecting apparatus comprising an internal memory device storing data, an external memory medium capable of storing data, detector means for detecting whether the external memory medium is loaded and data is stored therein, display means operable if the external memory medium is loaded and the data is stored therein for mixing or merging the data stored in the external memory medium with the data stored in the internal memory device, then sorting the mixed data under a predetermined sorting condition, and displaying the resultant data, and otherwise being operable if the external memory medium is not loaded or the data is not stored therein for displaying the data stored in the internal memory device, and selector means for selecting desired data from the data being displayed by the display means. Thus, if the data is not stored in the external memory medium, desired data can be selected from the data stored in the internal memory device. If the data is stored in the external memory medium, the desired data can be selected from both the data stored in the external memory medium and the internal memory device.

In carrying out the invention and according to another aspect thereof, there is provided a data selecting apparatus comprising an internal memory device including a first data memory area capable of storing data and a second data memory area storing data, an external memory medium capable of storing data, detector means for detecting or checking whether the external memory medium is loaded and data is stored therein, the detector means further being operative if the external memory medium is loaded and the data is stored therein for detecting or checking whether data is stored in the first data memory area in the internal memory device, controller means operative if the external memory medium is loaded and data is stored therein and data is not stored in the first data memory area in the internal memory device for loading the data from the external memory medium into the first data memory area in the internal memory device, the controller means being operative if data is stored in the first data memory area of the internal memory device for checking whether that data is the same as the data stored in the external memory medium, further the controller means being operative if difference is found between these pieces of data for loading the data from the external memory medium into the first data memory area in the internal memory device, otherwise the controller means being operative if match is found for stopping loading of the data from the external memory medium into the first data memory area in the internal memory device, and selector means for selecting desired data from the data written by the controller means to the first data memory area in the internal memory device and the data stored in the second data memory area in the internal memory device. Thus, if the same data as the data stored in the external memory medium is already stored in the internal memory device, loading of the data from the external memory medium into the internal memory device is not performed.

BRIEF DESCRIPTION OF THE DRAWINGS

These and other objects of the invention will be seen by reference to the description, taken in connection with the accompanying drawings, in which:

FIG. 6 is a diagram illustrating a format of a song table;

FIG. 7(A) is a diagram illustrating a format of an artist table;

FIG. 7(B) is a diagram illustrating a format of a composer table;

FIG. 7(C) is a diagram illustrating a format of a genre table;

FIG. 20 is a diagram illustrating constitution of another sort table.

DETAILED DESCRIPTION OF PREFERRED EMBODIMENTS

This invention will be described in further detail by way of example with reference to the accompanying drawings.

FIGS. 1 through 4 illustrate a method of selecting music performance configuration data. By requesting or designating a desired song, music performance configuration data matching the desired song can be properly selected according to the invention. This method is hereafter referred to as song image setting (SIS).

Figure 1:
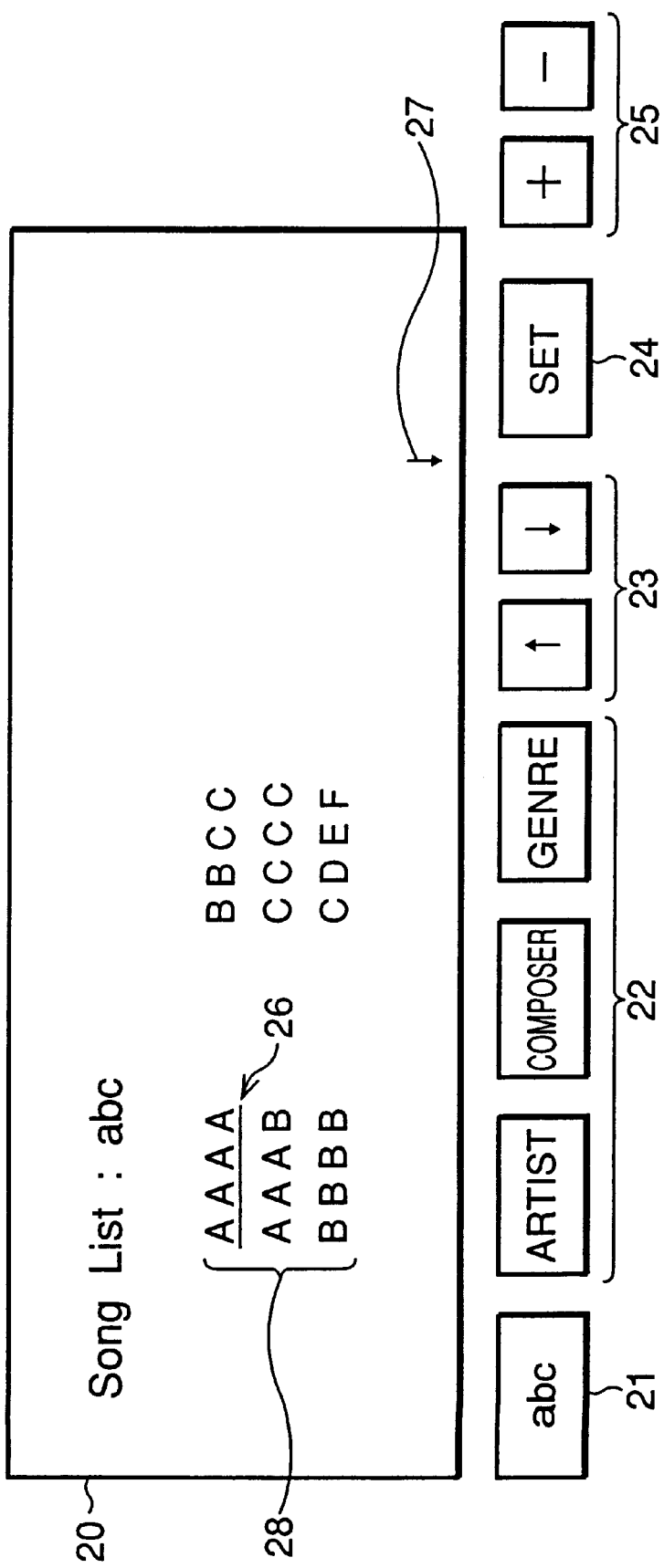
FIG. 1 is a diagram illustrating a display screen for selecting music performance configuration data by use of a data selecting apparatus practiced as one preferred embodiment of the present invention.

Now, FIG. 1 shows a display screen 20 of the data selecting apparatus practiced as one preferred embodiment of the invention, and operation switches 21, 22, 23, 24, and 25 arranged under the display screen. The abc switch 21 is used to display a song list on the display screen 20. To be more specific, when the abc switch 21 is operated, a list 28 appears on the display screen 20 to display six song titles in the order of alphabets or in the order of "Japanese 50 sounds" (a Japanese collation sequence that follows the ordering from a table made of five-by-ten matrix of which total number of possible sounds is 50). The song titles are displayed in the order of AAAA, AAAB, BBBB, BBCC, CCCC, and CDEF for example.

An arrow 27 marks that a next screen follows. The display screen 20 can display only six song titles for example at a time. If there are more than six song titles to be displayed, the arrow 27 appears. Namely, the arrow 27 teaches the user that there are more song titles than those currently displayed on the screen.

Operating the cursor move switch 23, the operator can move a cursor 26 on the display screen 20. If an attempt is made to move the cursor down from the bottom of the left column in the list 28, the cursor jumps to the top of the right column. Conversely, if an attempt is made to move up the cursor from the top of the right column, the cursor jumps to the bottom of the left column. When the cursor is moved to the bottom of the right column, subsequent song titles can be displayed on the display screen 20.

The following describes a method of selecting a song title. Operating the cursor move switch 23, the user moves the cursor 26 to the position of a desired song title. Referring to FIG. 1, the cursor 26 is positioned at title AAAA. When the user presses the set switch 24 in this state, the music performance configuration data adapted to the song title AAAA is automatically set to a music apparatus containing the data selecting apparatus.

In addition to the abc switch 21, the cursor move switch 23, and the set switch 24, there are a keyword switch 22 and a value change switch 25 in the data selecting apparatus. The keyword switch 22 is composed of an artist switch, a composer switch, and a genre switch. Operating the keyword switch 22, the user can select a keyword in terms of artist, composer, or genre.

Figure 2:
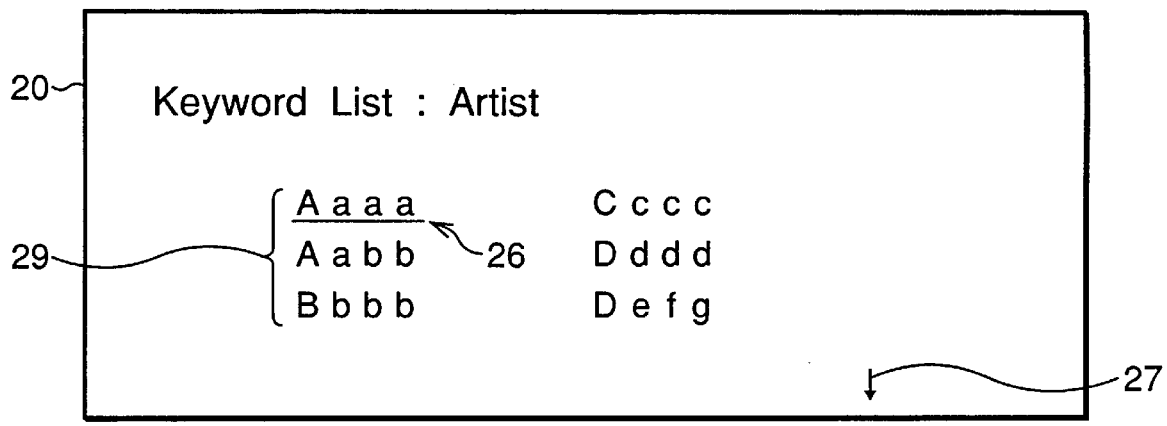
FIG. 2 is a diagram illustrating another display screen for selecting music performance configuration data by use of the above-mentioned embodiment.

The following describes an example in which an artist is selected as the keyword. The description also applies to the keywords of composer or genre. FIG. 2 shows a display screen appearing when an artist is selected as the keyword. In order to indicate that the artist term has been selected as the keyword, message "Keyword List: Artist" is shown at the top of the display screen 20. It should be noted that the same operation switches as those shown in FIG. 1 are arranged below the display screen 20 of FIGS. 2, 3, and 4.

When the artist term is selected as the keyword by operating the keyword switch 22, a list of artists is shown on the display screen 20, the artists being arranged in the alphabetical order or in the order of Japanese 50 sounds. On the display 20, six artist names for example are shown in the list 29. The artist names are displayed in the order of Aaaa, Aabb, Bbbb, Cccc, Dddd, and Defg for example. An artist is a professional music player for example. The arrow 27 indicates that other artist names follow.

The following describes a method of selecting an artist. Operating the cursor move switch 23, the user points the cursor 26 to the position of a desired artist. In FIG. 2, the cursor 26 is positioned to artist name Aaaa. When the user presses the set switch 24 in this state, a list of song titles to be performed by the pointed artist appears on the display screen 20.

Figure 3:
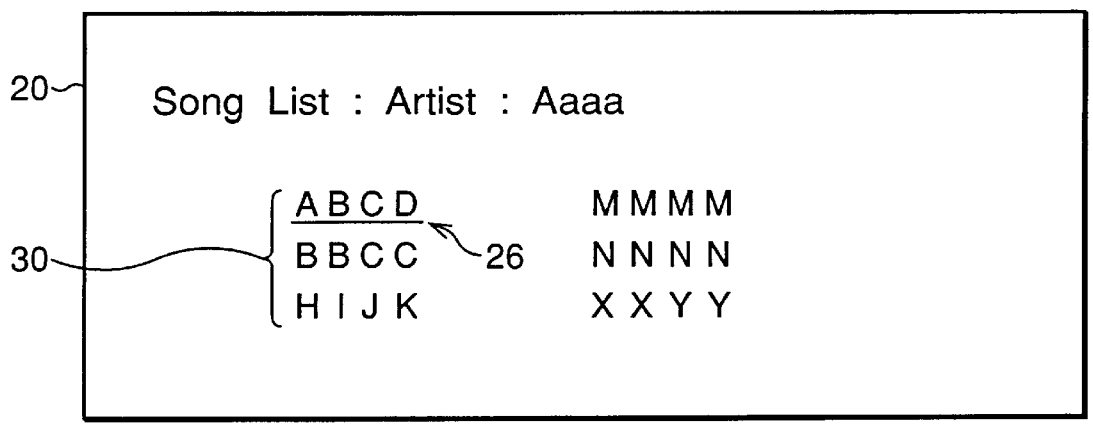
FIG. 3 is a diagram illustrating a further display screen for selecting music performance configuration data by use of the above-mentioned embodiment.

FIG. 3 shows a display screen appearing when the set switch is pressed while the artist name Aaaa is selected. In order to indicate that artist name Aaaa has been selected, message "Artist: Aaaa" is shown at the top of the display screen 20. The display screen 20 shows a list 30 of song titles entitled and performed by the selected artist in the alphabetical or Japanese 50 sounds order. The display screen 20 shows six song titles for example. The song titles are listed in the order of ABCD, BBCC, HIJK, MMMM, NNNN, and XXYY for example.

As shown in FIG. 1, operation of the abc switch displays the list of all song titles. Because the number of song titles is fairly great, a keyword is used to reduce the number of song titles. For example, when artist name Aaaa is selected as the keyword, only the list 30 of song titles that belong to artist name Aaaa is displayed as shown in FIG. 3. Thus, using a keyword, the user can find a desired song title quickly and easily.

The following describes a method of selecting a song title with reference to FIG. 3. Operating the cursor move switch 23, the user points the cursor to the position of a desired song title. In FIG. 3, the cursor 26 is positioned at song title ABCD. When the user presses the set switch 24 in this state, the music performance configuration data adapted to the song title ABCD is displayed.

Figure 4:
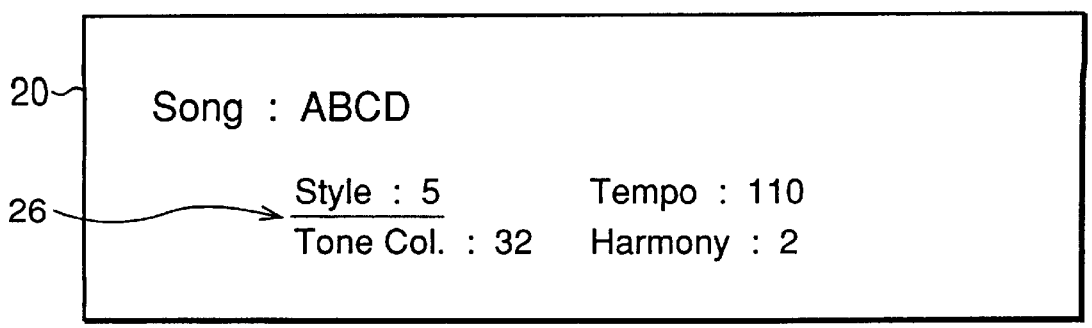
FIG. 4 is a diagram illustrating a still further display screen for selecting music performance configuration data by use of the above-mentioned embodiment.

FIG. 4 shows a display screen appearing when the song title ABCD has been selected in FIG. 3. To indicate that the song title ABCD has been selected, message "Song: ABCD" is shown at the top of the display screen 20. The display screen 20 shows the contents of the music performance configuration data designed for and adapted to the selected song title ABCD; for example, accompaniment style is number 5 (Style: 5), melody timbre is number 32 (Tone Col: 32), tempo is value 110 (Tempo: 110), and harmony is number 2 (Harmony: 2). The user can confirm whether the displayed contents are satisfactory or not. If the contents are found good, the user presses the set switch 24 to set the selected music performance configuration data. If the user wants to correct a part of the contents, the user operates the cursor move switch 23 to move the cursor 26 to a position of a target parameter contained in the music performance configuration data to be corrected. Then, using the value change switch 25 shown in FIG. 1, the user corrects the parameter to a desired value. When the correction is completed, the user presses the set switch 24 to establish the new setting. Thus, the user can modify or change the selected music performance configuration data.

Figure 5:
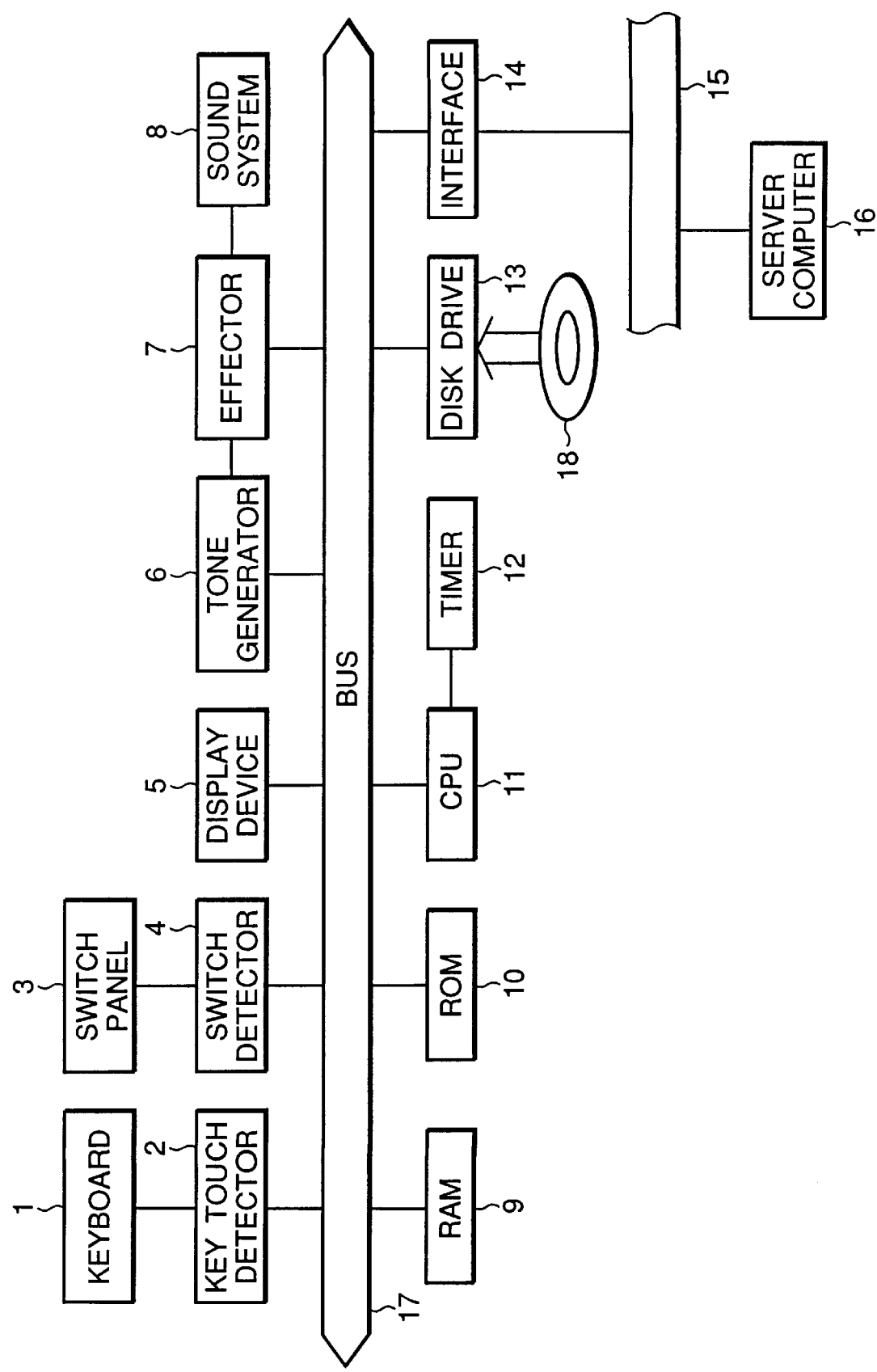
FIG. 5 is a block diagram illustrating constitution of a personal computer including the above-mentioned embodiment of the data selecting apparatus.

FIG. 5 is a block diagram illustrating constitution of an electronic musical instrument or music apparatus containing the above-mentioned data selecting apparatus. In the figure, a key touch detector 2 detects an operation performed on a keyboard 1 to generate a note-on signal or a note-off signal. A switch detector 4 detects an operation performed on a switch panel 3 to generate a switch signal. A bus 17 is connected to a display device 5, a tone generator 6, an effector 7, a RAM 9, a ROM 10, a CPU 11, a disk drive 13, and a communication interface 14 in addition to the key touch detector 2 and the switch detector 4.

The RAM 9 has a work area for storing a flag, a buffer and so on, which are used by the CPU 11. The ROM 10 stores various parameters and a computer program. The CPU 11 performs computation or control as instructed by the computer program stored in the ROM 10. A timer 12 is connected to the CPU 11. The CPU 11 obtains clock information from the timer 12. The communication interface 14 is a MIDI interface or a communication network interface. The disk drive 13 includes an interface for connection to the bus 17. The disk drive is a floppy disk drive (FDD), a hard disk drive (HDD), a magneto-optical (MO) disk drive or a CD-ROM drive, by way of example. The disk drive 13 can receive therein an external memory medium 18 such as floppy disk, magneto-optical disk and CD-ROM. The disk drive 13, the ROM 10, or the RAM 9 stores a song table and a keyword table necessary for selecting and setting music performance configuration data. If the disk drive 13 accommodates therein the external memory medium 18 storing song data and so on, the song data is loaded from the disk drive 13 to the RAM 9 before being processed in a predetermined manner. The above-mentioned music performance configuration data includes performance pattern data such as accompaniment style data (or accompaniment pattern data). The CPU 11 reads the music performance data from the RAM 9 or the ROM 10 and, at the same time, supplies a tone parameter and an effect parameter to the tone generator 6 and the effector 7, respectively. Alternatively, the CPU 11 generates a tone parameter and an effect parameter according to a note-on signal and so on generated by the key touch detector 2 and a switch signal generated by the switch detector 4, and supplies the generated tone parameter and effect parameter to the tone generator 6 and the effector 7, respectively.

The tone generator 6 generates a tone signal according to the tone parameter supplied from the CPU 11. The effector 7 imparts an effect such as delay or reverberation to the tone signal generated by the tone generator 6, and supplies the resultant signal to a sound system 8. The sound system 8 includes a D/A converter and a loudspeaker to convert the supplied digital tone signal into an analog signal and to sound the same. The tone generator 6 may be any one of the following types: wave table, FM, physical model, harmonics synthesis, formant synthesis, and analog synthesis including VCO, VCF and VCA. Further, the tone generator 6 may be constituted by a dedicated hardware board, a DSP, or a microprogram. Alternatively, the tone generator 6 may be constituted by a software module driven by the CPU 11 according to a computer program. Still further, one tone generator may be used in a time division manner to form plural sounding channels. Alternatively, plural sounding channels may be constituted, each being based on one tone generator.

The computer program and various pieces of data may be stored in the external memory medium 18 inserted into the disk drive 13 rather than in the ROM 10. For example, a hard disk is held in a hard disk drive (HDD). Loading the computer program and so on from the hard disk into the RAM 9 can make the CPU 11 perform the same operation as that to be performed by the CPU 11 when the computer program and so on are stored in the ROM 11. Storing the computer program and so on in the hard disk facilitates addition and upgrading of the computer program and so on. Alternatively, the computer program and various pieces of data may be stored in the CD-ROM, for example. If this is made, the computer program and so on may be copied from the CD-ROM to the hard disk. This facilitates installation and upgrading of the computer program and so on.

The communication interface 14 is connected to a communication network 15 such as a LAN (Local Area Network) or a telephone line. This electronic musical instrument is connected to a server computer 16 through the communication network 15. If the computer program and so on are not stored on the disk in the disk drive 13 (for example, the HDD), the computer program and so on can be downloaded from the server computer 16. In this case, the electronic musical instrument, a client to the server computer 16, sends a request through the communication network 15 to the server computer 16 for downloading the computer program and so on. Upon receiving the request, the server computer 16 distributes the requested computer program and so on to the client through the computer network 15. The electronic musical instrument stores the received computer program and so on in the disk drive (for example, HDD), upon which the downloading is completed.

FIG. 6 shows a format of a song table stored in the ROM 10, RAM 9, or the disk drive 13. The song table contains a song code 35, a song title 36, a keyword 37, and music performance configuration data 38 in a related manner. For example, the song table lists a set of 400 song titles assigned with song codes in one to one correspondence. Preferably, as the song codes ascend, the song titles are arranged in the alphabetical or Japanese 50 sounds order.

The keyword 37 consists of an artist code, a composer code, and a genre code. For example, the song identified by song code 1 has a title AAAA, artist code 35, composer code 5, and genre code 22. Each code is a keyword index. Use of the keyword 37 can search song titles matching the particular keyword.

The music performance configuration data 38 consists of a style code, a timbre code, a temp code, and a harmony code. For example, when the song code 1 (song title is AAAA) is selected, the style code is set to 10, the timbre code is set to 1, the tempo value is set to 150, and the harmony code is set to 2.

FIGS. 7(A) through 7(C) show formats of keyword tables stored in the ROM, RAM, or the disk drive. FIG. 7(A) shows a format of an artist table. The artist table stores artist codes and artist names in a corresponding manner. The artist code corresponds to the artist code of the keyword 37 shown in FIG. 6. For example, the artist table lists 80 artist names, each being assigned with an artist code. Preferably, the artist names are arranged in the alphabetical or Japanese 50 sounds order as the artist codes ascend.

FIG. 7(B) shows a format of a composer table. The composer table stores the composer codes and the composer names in a corresponding manner. For example, the composer table lists 62 composer names. Preferably, the composer names are arranged in the alphabetical or Japanese 50 sounds order as the composer codes ascend.

FIG. 7(C) shows a format of a genre table. The genre table stores genre codes and genre names in a corresponding manner. The genre codes correspond to the genre codes of the keyword 37 shown in FIG. 6. The genre names are rock, pops, dance, and Japanese Enka, for example. Preferably, the genre codes are arranged in the order of usage frequency or arranged in groups.

Figure 8A:
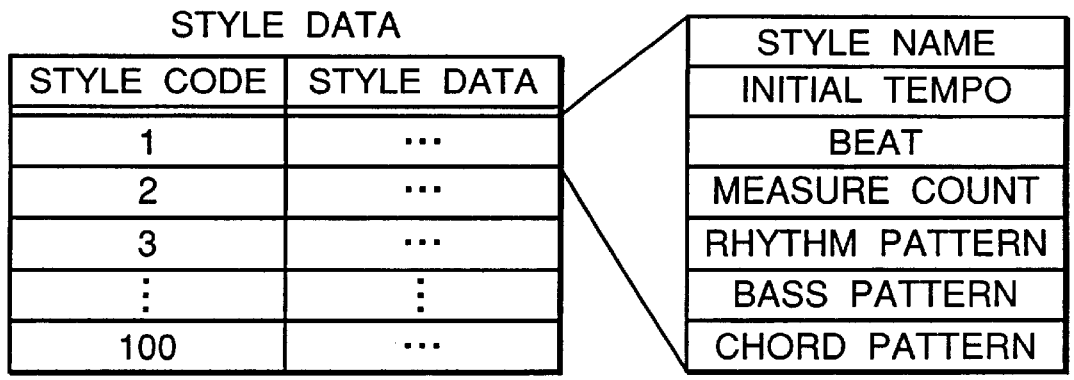
FIG. 8(A) is a diagram illustrating a format of style data.
Figure 8B:
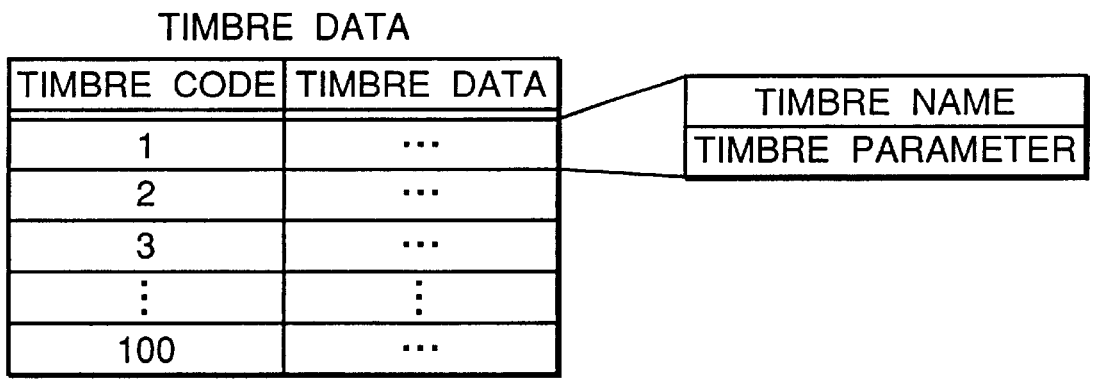
FIG. 8(B) is a diagram illustrating a format of timbre data.
Figure 8C:
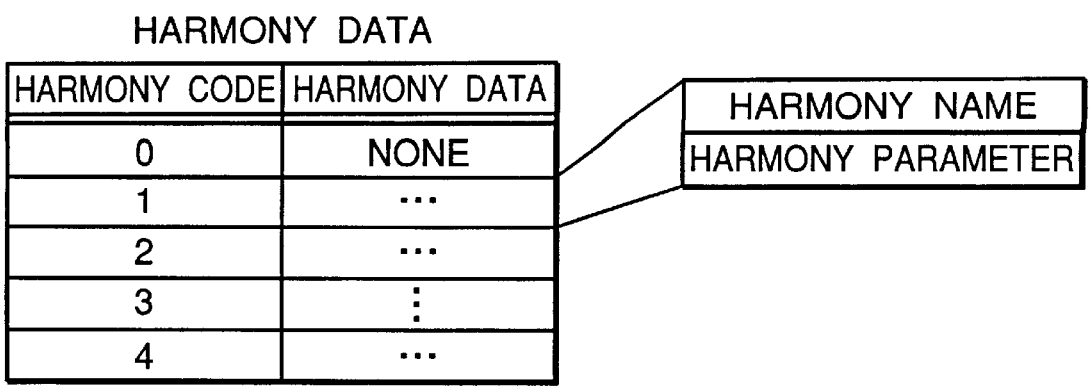
FIG. 8(C) is a diagram illustrating a format of harmony data.

FIGS. 8(A) through (C) show formats of the music performance configuration data stored in the ROM, RAM or the disk drive. FIG. 8(A) shows a format of style data. Each item of the style data is identified by a style code. The style code corresponds to the style code of the music performance configuration data shown in FIG. 6. The one item of the style data includes a style name, an initial tempo, a beat, a measure count, a rhythm pattern, a bass pattern, and a chord pattern. The initial tempo differs from the tempo value shown in FIG. 6. The tempo value shown in FIG. 6 is set by selecting a song title. The initial tempo shown in FIG. 8(A) is a default tempo to be set when only a style is selected rather than a song title. Therefore, when a song title is selected, the initial tempo is ignored and the tempo value shown in FIG. 6 is used. The above-mentioned rhythm pattern, bass pattern, and chord pattern include patterns of plural sections such as introduction, main, fill-in, and ending.

FIG. 8(B) shows a format of timbre data. The timbre data defines the timbre of a tone to be generated when the keyboard 1 is operated. Each item of the timbre data is identified by a timbre code, which corresponds to the timbre code of the music performance configuration data 38 shown in FIG. 6. The one item of the timbre data includes a timbre name and a timbre parameter.

FIG. 8(C) shows a format of harmony data. The harmony data is identified by harmony codes. The harmony codes correspond to the harmony codes of the music performance configuration data 38 shown in FIG. 6. Harmony code 0 has no harmony data and no harmony is added when this code is specified. For example, for a piano solo, it is better to add no harmony. Items having harmony codes 1 or higher number have harmony data and therefore are added with harmony. The harmony data includes a harmony name and a harmony parameter. The harmony parameter includes information indicating harmony tones to be added to a melody tone played by a performer using the keyboard 1 as well as a volume and a sounding timing of the harmony tones to be added.

Figure 9:
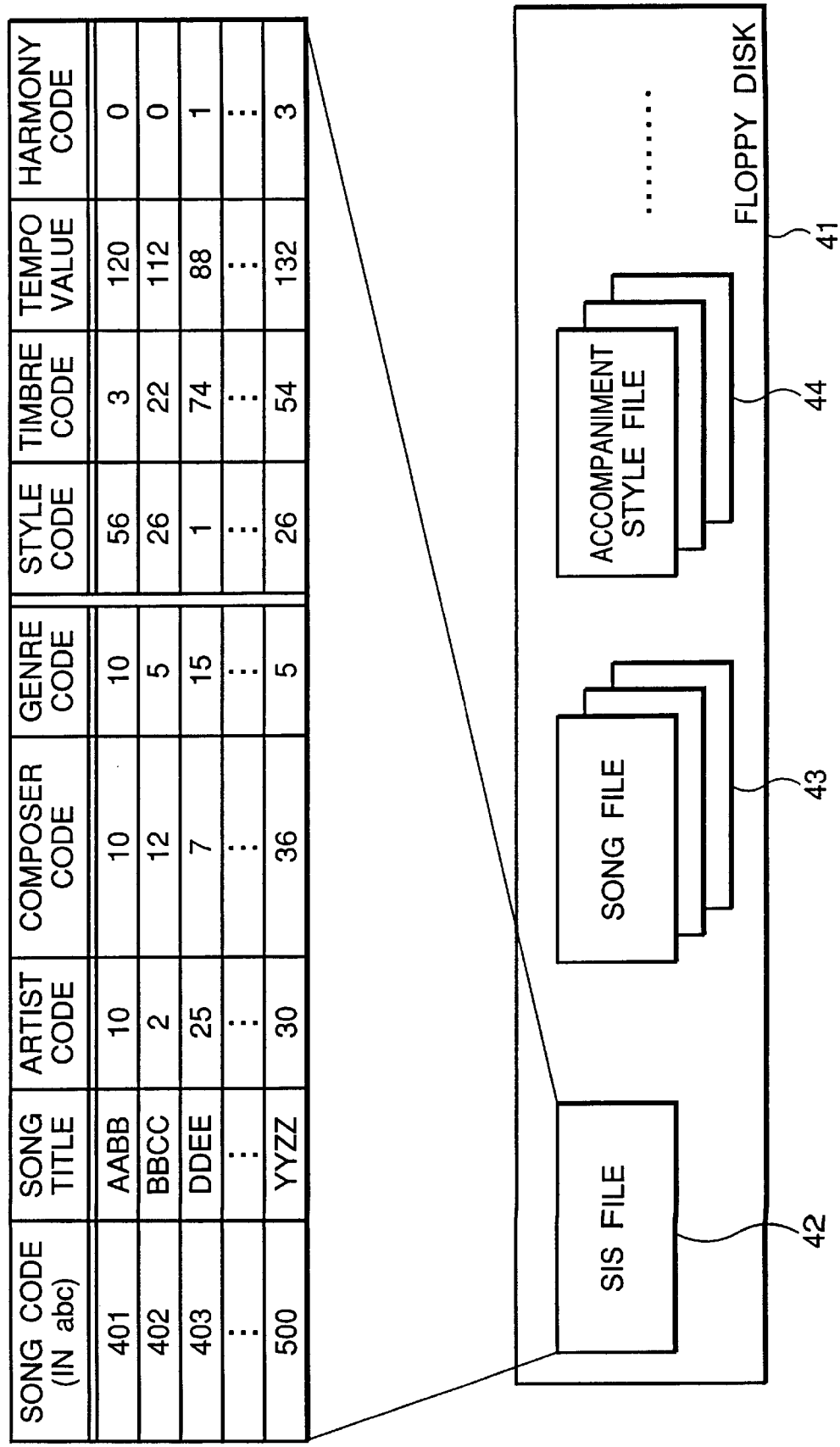
FIG. 9 is a diagram illustrating constitution of a floppy disk for storing an additional SIS file.

The following describes an example in which a new song table is added. To add new songs, a new song table can be provided to the user by means of an external memory medium such as a floppy disk. If a basic song table is stored in the ROM beforehand, the new song table can be supplemented by means of a floppy disk, for example. FIG. 9 shows contents of the floppy disk provided to the user. The floppy disk 41 stores a song image setting (SIS) file 42, a song file 43, and an accompaniment style file 44. The SIS file contains SIS data. The SIS data is a song table listing a set of song items or titles identified by song codes 401 to 500, for example. This song table has the same format as that of the song table shown in FIG. 6 and is added thereto. It should be noted that the SIS data may include a keyword table and a music performance configuration data table in addition to the song table. The song file 43 contains automatic performance data. The accompaniment style file 44 stores automatic accompaniment data. Each of the song files is equivalent to one song. Each of the style files is also equivalent to one song. The floppy disk 41 stores one SIS file 42, plural song files 43, and plural accompaniment style files 44, for example.

Figure 10:
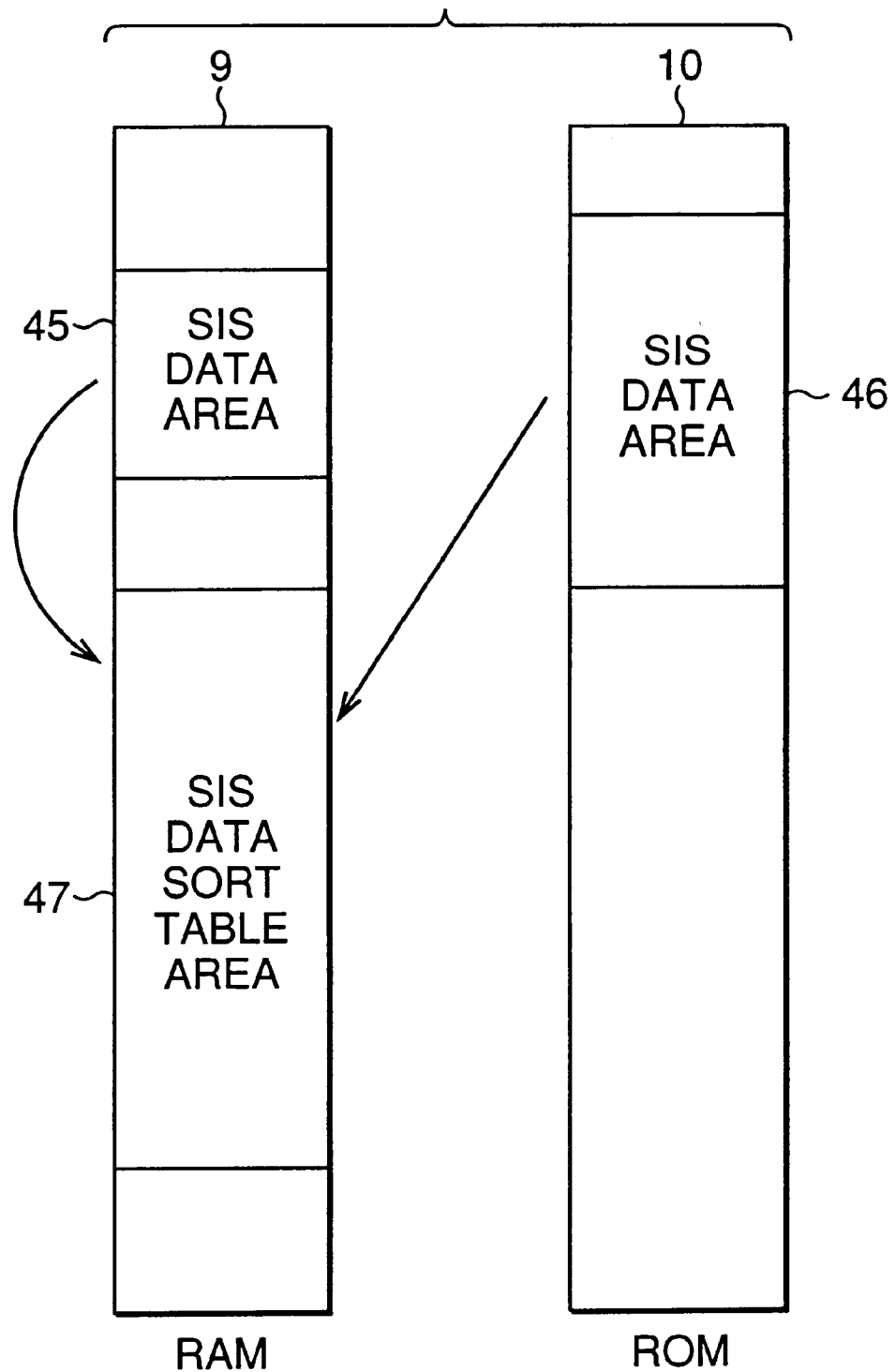
FIG. 10 is a diagram illustrating constitutions of RAM and ROM.

FIG. 10 shows memory maps of an internal memory device connected to the electronic musical instrument shown in FIG. 5. The internal memory device is composed of the rewritable RAM 9 and the permanent ROM 10. The ROM 10 has a SIS data area 46. The SIS data area 46 stores a set of basic SIS data, which is kept permanent even when the power is turned off. The manufacturer of the electronic musical instrument can write a basic set of the SIS data into the SIS data area 46 at fabrication. For example, the song table listing the song items identified by the song codes 1 to 400 shown in FIG. 6 can be stored as the basic set of the SIS data in the SIS data area 46.

The RAM 9 has another SIS data area 45 and an SIS data sort table area 47. The SIS data area 45 can store another set of the SIS data provided by the external memory medium 18 (for example, a floppy disk accessible from the disk drive 13) or a further set of the SIS data supplied via the communication interface 14. The SIS data area 45 can store the song table listing song items identified by song codes 401 to 500 shown in FIG. 9 as an additional set of the SIS data.

The SIS data sort table area 47 stores merged results of the first SIS data stored in the SIS data area 46 and the second SIS data stored in the SIS data area 45. In such a case, the CPU 11 sorts the merged data. Namely, the basic SIS data stored in the SIS data area 46 is merged with the additional SIS data stored in the SIS data area 45. The merged SIS data are sorted in the SIS data sort table area 47. If the additional SIS data is not stored in the SIS data area 45 of the RAM 9, only the SIS data stored in the ROM 10 is registered in the SIS data sort table area 47. When selecting and setting the music performance configuration data, the before-mentioned processing can be performed by operating a SIS switch included in the switch panel 3 shown in FIG. 5. Moreover, by operating the SIS switch, the user can automatically add SIS data.

As described above and as shown in FIG. 5, the inventive data selecting apparatus is constructed for selecting a desired data item. In the apparatus, an internal memory device including the RAM 9 and the ROM 10 memorizes a first set of data items. A peripheral device is provided in the form of the disk drive 13 for accessing the external memory medium 18. A detector device functionally provided by the CPU 11 presents a detection signal when the peripheral device receives the external memory medium 18 for accessing and when the received external memory medium 18 stores a second set of data items upon accessing. A controller device also provided by the CPU 11 responds to the detection signal for merging the first set of data items retrieved from the internal memory device and the second set of data items retrieved from the external memory medium 18 with each other and for sorting the merged data items in a predetermined order. The display device 5 operates upon presence of the detection signal for displaying both of the first and second sets of the data items in the predetermined order, and operates upon absence of the detection signal for displaying only the first set of data items. A selector device composed of the switch panel 3 selects a desired data item from the displayed data items.

Preferably, the internal memory device has a permanent memory in the form of the ROM 10 that memorizes the first set of data items and a temporary memory in the form of the RAM 9 that is rewritable with data items. The controller device loads the first set of data items into the temporary memory from the permanent memory and loads the second set of data items into the temporary memory from the external memory medium 18 so that the first and second sets of data items are merged and sorted in the temporary memory. Moreover, the detector device may present a further detection signal when the temporary memory is already written with a third set of data items. The controller device responds to the further detection signal for loading the second set of data items into the temporary memory from the external memory medium 18 to overwrite the third set of data items when the second set of data items is different than the third set of data items, and otherwise for stopping the loading of the second set of data items when the second set of data items is identical to the third set of data items.

Preferably, the selector device inputs a keyword associative of a desired data item prior to selection of the desired data item. The controller device searches the sorted data items in accordance with the inputted keyword to identify data items matching the keyword. The display device 5 exclusively displays the identified data items to facilitate selection of the desired data item.

Figure 11:
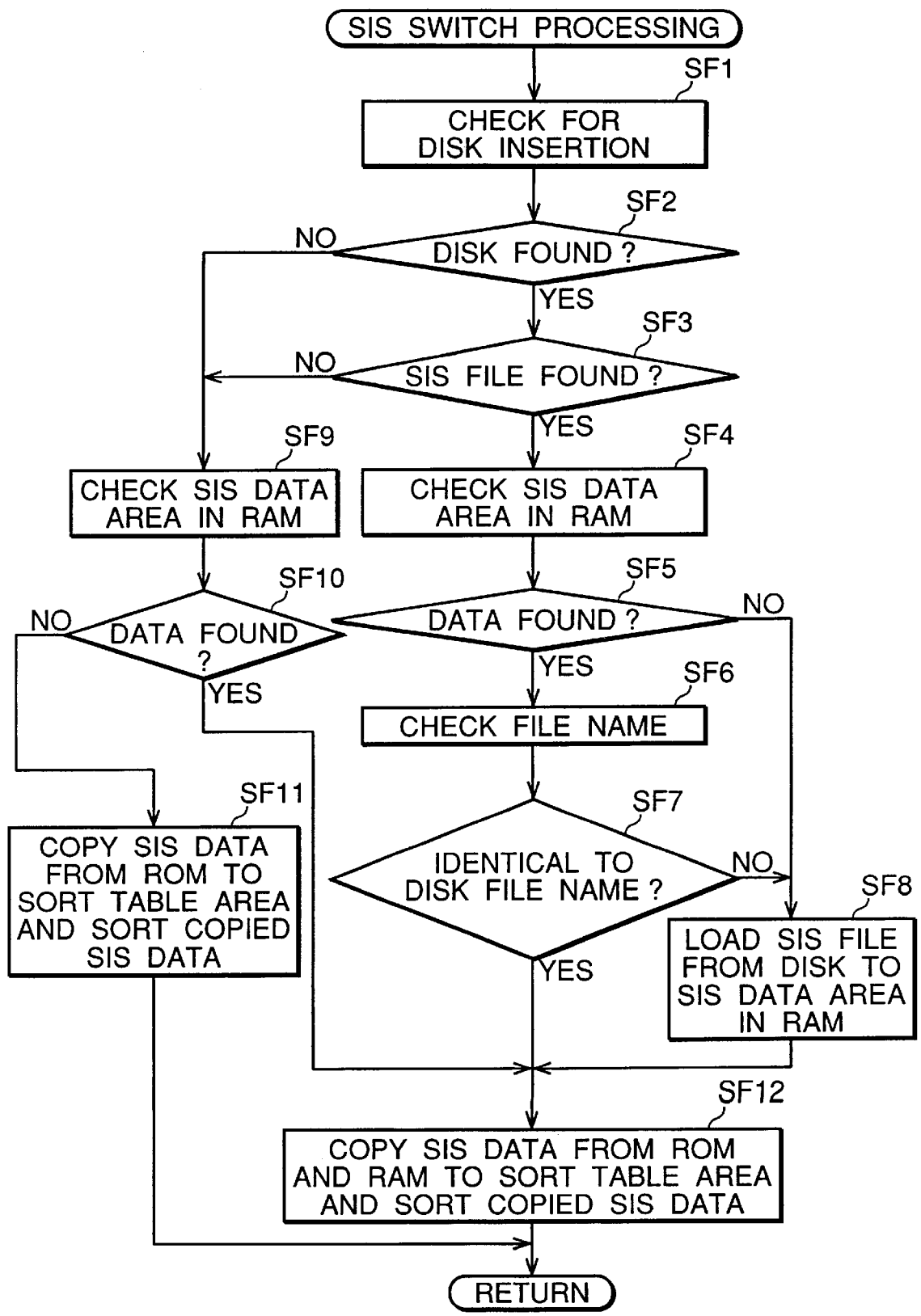
FIG. 11 is a flowchart for describing processing to be performed by CPU of a personal computer when a SIS switch is operated.

FIG. 11 is a flowchart for describing the processing to be performed by the CPU 11 when the SIS switch is operated. In step SF1, it is determined whether an external memory medium (for example, a floppy disk) is loaded in the disk drive (for example, a floppy disk drive). The following description is made by using an example in which the external memory medium is a floppy disk. If the floppy disk is found loaded, then, in step SF2, the decision is YES, upon which the SIS switch processing goes to step SF3. In step SF3, it is determined whether the SIS file is stored in the floppy disk. FIG. 9 shows the example in which the SIS file 42 is stored in the floppy disk 41. Sometimes, only the song file 43 is stored in the floppy disk 41. If the SIS file is found stored, the processing goes to step SF4.

In step SF4, it is determined whether the SIS data is already stored in the SIS data area 45 of the RAM 9. The decision or detection is made by the detector device made up of the CPU in step SF5. If the SIS data is not stored in the RAM, the processing goes to step SF8. In step SF8, the SIS data is loaded from the SIS file stored in the floppy disk into the SIS data area 45 of the RAM 9. At the same time, the file name of SIS file from which the loading is made (namely, volume name of the floppy disk) is also stored in the SIS data area 45. Then, the processing goes to step SF12, in which the SIS data stored in the SIS data area 45 of the RAM 9 and the other SIS data stored in the SIS data area 46 of the ROM 10 are copied onto the SIS data sort table area 47 of the RAM 9 by means of the controller device made up of the CPU 11. Further, the merged SIS data are sorted in terms of the song code or song title. Then, the SIS switch processing comes to an end.

Subsequently, when selecting the music performance configuration data, the SIS data stored in the SIS data sort table area 47 is used. For example, when the abc switch is pressed, the list of song titles is displayed. When keyword search is performed, the song titles related to that keyword are displayed.

Referring to FIG. 11 again, if it is detected in step SF5 that the SIS data has already been stored in the SIS data area 45 of the RAM 9, the SIS data stored in the floppy disk is not immediately loaded into the RAM but the processing goes to step SF6. In step SF6, the file name of the SIS file stored in the floppy disk and the file name of the SIS data stored in the SIS data area 45 of the RAM 9 are checked with each other. In the SIS data area, the SIS data is stored along with the file name. In step SF7, it is determined whether both of the file names match with each other. If match is not found, then, in step SF8, the SIS file in the floppy disk is written into the SIS data area 45 of the RAM 9. Thus, in the SIS data area 45, the old SIS data is overwritten by the new SIS data. Then, in step SF12, the SIS data stored in the SIS data area 45 in the RAM 9 and the SIS data stored in the SIS data area 46 in the ROM 10 are copied onto the SIS data sort table area 47 in the RAM 9. When the sorting is over, the SIS switch processing comes to an end.

IF a match is found between both of the file names in step SF7, it is recognized that the same files are stored in both the floppy disk and the RAM, upon which the processing goes directly to step SF12 without loading the SIS data from the floppy disk to the RAM. In step SF12, the SIS data stored in the SIS data area 45 in the RAM 9 and the SIS data stored in the SIS data area 46 in the ROM 10 are copied onto the SIS data sort table area 47 in the RAM 9, upon which the SIS switch processing comes to an end.

If, no floppy disk is inserted in step SF2, the processing goes to step SF9. Even when the floppy disk is inserted, if the SIS file is not found in the floppy disk in step SF3, the processing also goes to step SF9. In step SF9, the SIS data is not loaded from the floppy disk, but it is determined whether the SIS data is stored in the SIS data area 45 in the RAM 9. If the SIS data is found in step SF10, then, in step SF12, the SIS data stored in the SIS data area 45 of the RAM 9 and the SIS data stored in the SIS data area 46 of the ROM 10 are copied onto the SIS data sort table area 47 of the RAM 9, upon which the SIS switch processing comes to an end.

If the SIS data is not found in the step SF10, the processing goes to step SF11. In step SF11, only the SIS data stored in the SIS data area of the ROM 10 is copied onto the sort table area 47 of the RAM 9. If the SIS data in the SIS data area 46 has already been sorted, then, the SIS data need not be sorted in the sort table area 47. Then, the SIS switch processing comes to an end.

It should be noted that the additional SIS file may also be supplied by means of other external memory media than a floppy disk. Such other external memory media include a hard disk, a CD-ROM, and a magneto-optical disk, for example. Alternatively, memory media provided on a network-connected electronic musical instrument or computer may be used. If plural types of external memory media are loaded (for example, floppy disk and CD-ROM), these external memory media from which data is loaded may be selected according to a predetermined priority.

Thus, even if the user does not know the location of the desired SIS data whether in the internal memory device such as the ROM or the external memory medium such as the floppy disk, the user can load the desired SIS data into the predetermined data area simply by operating the SIS switch. If the SIS switch is not provided, the user must attempt to select the music performance configuration data based on the SIS data stored in the ROM or the RAM. If the desired SIS data is not found in the ROM or the RAM, the user must search the external memory medium for the desired data. Otherwise, if the desired data is not found first in the external memory medium, then the user must search the ROM or the RAM second. These operations are complicated and therefore increase the operating work of the user. On the other hand, use of the SIS switch allows the user to load the desired SIS data into the sort table area for sorting even if the user does not know the exact contents of the internal memory device including the ROM and the RAM and the external memory medium such as a floppy disk. Thus, the user may only operate the SS switch to use the SIS data, without being aware of the external memory medium. If the same data as that stored in the external memory medium has already been loaded in the RAM, no reloading is required, thereby shortening the time in which the user waits for next operation.

As described, it is determined whether the file name of the file stored in the floppy disk is the same as that of the SIS data stored in the RAM 9 in steps SF6 and SF7. If these file names are found identical, these files are regarded to have the same SIS data. Alternatively, contents of both the SIS data themselves may be compared with each other to determine whether they are the same or not. In this case, the loading may be controlled not only in units of files but also in units of data items in a file. If this is done, data having the same song code are not loaded; only the data having different song codes can be loaded. In this case, actually new data is added rather than the old data is overwritten. The loading on the data item basis is applicable to not only the case in which one file contains many pieces of data (for example, data of 100 songs in the case of SIS data shown in FIG. 9) but also the case in which one file contains one piece of data.

In order to make distinction between the SIS data stored in the ROM 10 and the SIS data stored in the floppy disk, the song titles in the SIS data may be made unique. For example, there are two ways of the distinction: (1) the SIS data of the ROM 10 is given not an actual song title but a title intuiting that song, while the SIS data in the floppy disk is given the actual song title; and (2) the SIS data in the floppy disk is marked by an identification such as "disk" before or after the song title.

FIG. 9 shows the example in which one SIS file is stored in one floppy disk. It will be apparent that two or more SIS files may be stored. In the above-mentioned example, one SIS file is loaded into the RAM. It will also be apparent that two or more SIS files may be loaded. In this case, it is preferable to load as many files as the capacity of the RAM or the capability of the processing program allows. If an attempt is made to load the number of files exceeding the capacity of the RAM or the capability of the processing program or to load more files in addition to plural files already loaded, one of the following processing operations is performed: (1) the flies are selectively loaded according to a predetermined priority; (2) the files are selected by the user; (3) the least recently loaded file is deleted for a new file; and (4) the least frequently used file is deleted for a new file.

In the above-mentioned description, the SIS data is processed by operating the SIS switch. This method is also applicable to other data such as song data, accompaniment style data, and registration data. For example, instead of the SIS file, the song file or the style file may be loaded from the floppy disk into the RAM. In this case, the basic song data or accompaniment style data may be stored in the ROM beforehand. Further, plural song flies or plural accompaniment style files may be stored in the floppy disk. Also, in this case, the RAM and the floppy disk can be compared with each other to load only the files of the floppy disk, that are not stored in the RAM, into the RAM.

Figures 12, 13:
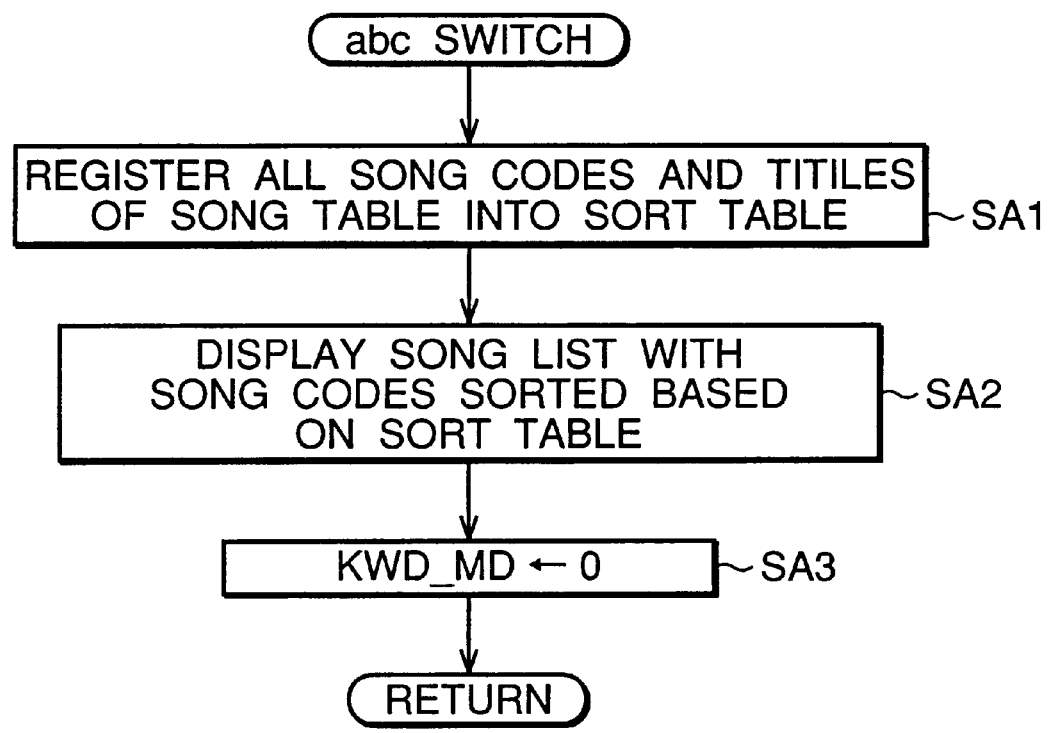
FIG. 12 is a flowchart for describing processing to be performed by the CPU of the personal computer when an abc switch is operated.
FIG. 13 is a diagram illustrating constitution of a sort table.

FIG. 12 is a flowchart for describing the processing to be performed by the CPU when the abc switch is operated. In step SA1, all song codes and song titles in the song table are registered in the sort table. In what follows, the additional song table shown in FIG. 9 is merged with the basic song table shown in FIG. 6. FIG. 13 shows a detailed format of the sort table stored in the area 47 shown in FIG. 10. In FIG. 13, song codes and song titles are registered in the sort table after performing keyword search. If keyword search is not performed beforehand, the sort table stores the maximum of song codes and song titles obtained by totaling all songs in the tables shown in FIGS. 6 and 9. The sort table stores the song codes and the song titles in a related manner with the sort sequence. Because the song table shown in FIG. 9 is merged, there occurs discontinuation in the alphabetical order of the song titles between the songs 1 through 400 and the songs 401 through 500 if the songs are simply arranged in the song code order. Therefore, in this step, the data of the song table shown in FIG. 6 and the data of the song table shown in FIG. 9 are merged and the merged data are sorted such that the song titles are arranged without discontinuation from the song 1 to the song 500. The data sorted this way is registered in the sort table.

In step SA2, the song list is displayed on the display device with the song codes arranged in the alphabetical or Japanese 50 sounds order based on the sort table. In step SA3, a keyword mode flag KWD_MD is set to "0" to end the processing of the abc switch. When the keyword mode flag KWD_MD is "0," the song select mode is provided; when this flag is "1," the keyword select mode is provided.

Figure 14:
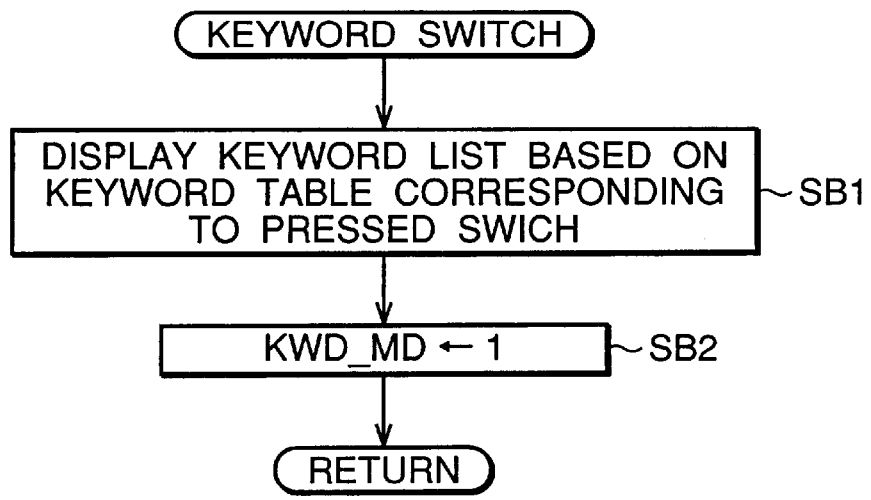
FIG. 14 is a flowchart for describing processing to be performed by the CPU of the personal computer when a keyword switch is operated.

FIG. 14 is a flowchart for describing the processing to be performed by the CPU when the keyword switch is operated. In step SB1, a keyword list is displayed on the display device based on a keyword table (FIG. 7(A) to FIG. 7(C)) corresponding to an operated switch (FIG. 2). When the keyword item is artist or composer, the keyword terms are displayed in the alphabetical or Japanese 50 sounds order. When the keyword item is genre, the keyword terms are displayed in the order of higher usage frequency or similarity of genre. In step SB2, the keyword mode flag KWD_MD is set to "1" to terminate the keyword switch processing. Setting the flag KWD_MD to "1" provides the keyword select mode.

Figure 15:
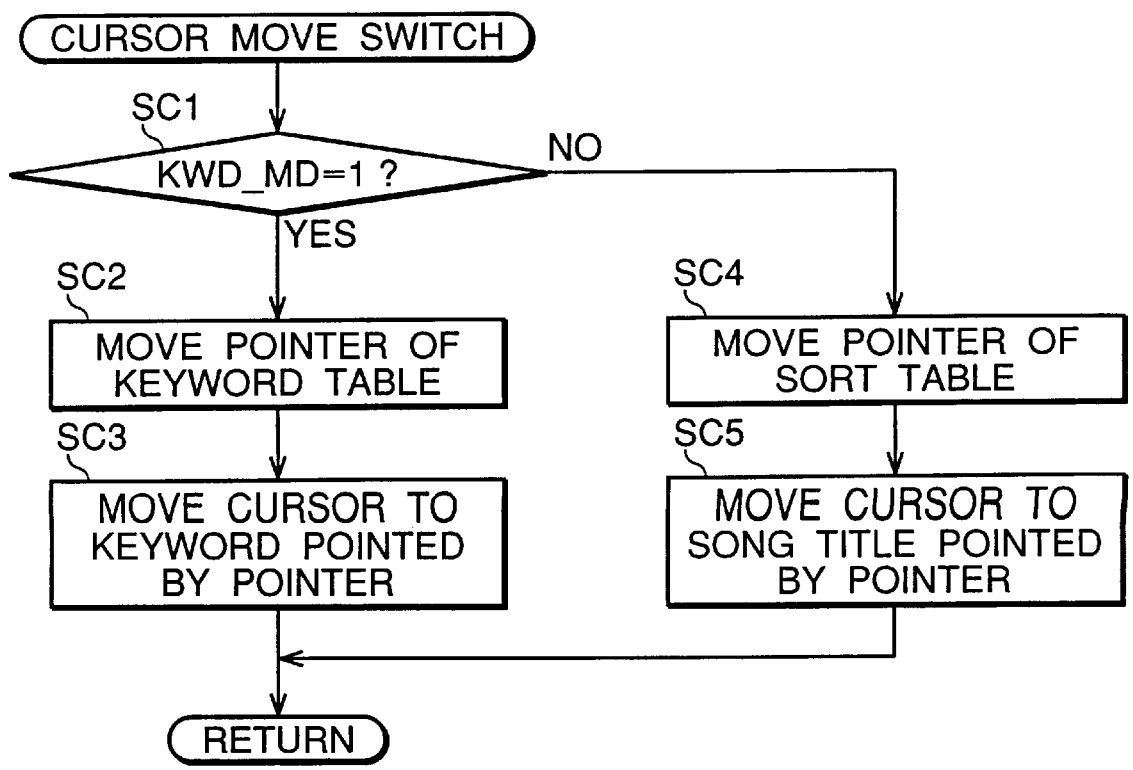
FIG. 15 is a flowchart for describing processing to be performed by the CPU of the personal computer when a cursor move switch is operated.

FIG. 15 shows a flowchart for describing the processing to be performed by the CPU when the cursor move switch is operated. In step SC1, it is determined whether the flag KWD_MD is "1" or not. If the flag KWD_MD is found "0," it indicates the song select mode, so that the processing goes to step SC4. In step SC4, an address pointer of the sort table (FIG. 13) is moved. Initially, the address pointer P is positioned at the beginning of the table shown in FIG. 13. When a cursor up switch is operated, the address pointer moves up. When a cursor down switch is operated, the address pointer is moves down. In step SC5, the cursor is moved on the display screen to a song title pointed by the address pointer of the sort table. As required, the screen is scrolled or the arrow 27 is displayed to indicate that more songs follow. Then, the cursor move switch processing comes to an end.

If, in step SC1, the flag KWD_MD is found "1," it indicates the keyword select mode, so that the processing goes to step SC2. Namely, if the cursor move switch is operated after the keyword switch is operated, the following processing is performed. First, in step SC2, the address pointer of the keyword table (FIG. 7(A) to FIG. 7(C)) is moved. In step SC3, the cursor is moved to the keyword pointed by the address pointer of the keyword table. As required, the screen is scrolled or the arrow 27 is displayed to indicate that more keywords follow. Then, the cursor move switch processing comes to an end.

Figure 16:
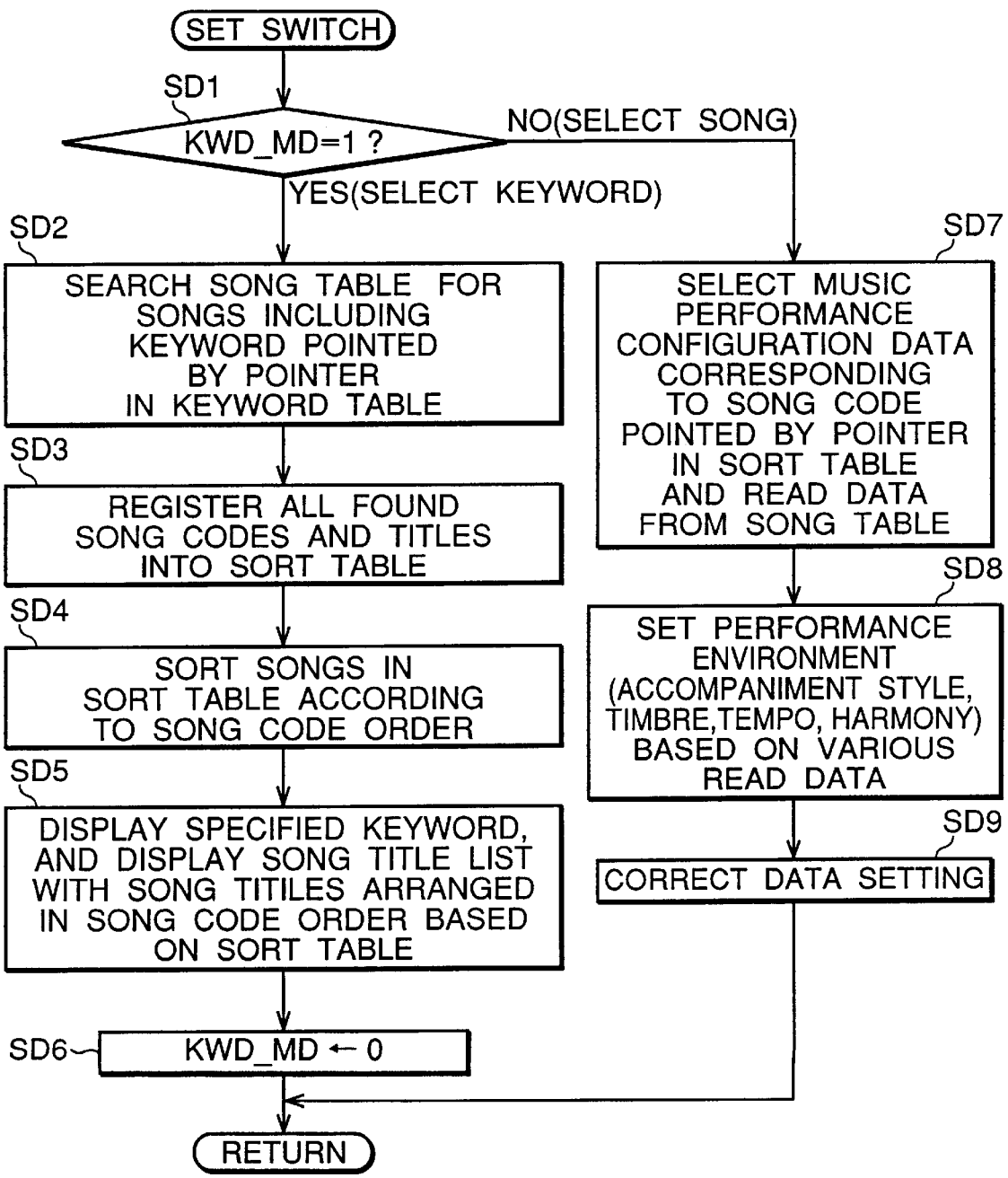
FIG. 16 is a flowchart for describing processing to be performed by the CPU of the personal computer when a set switch is operated.

FIG. 16 is a flowchart for describing the processing to be performed by the CPU when the set switch is operated. In step SD1, it is determined whether the flag KWD_MD is "1" or not. If the flag KWD_MD is found "1," it indicates the keyword select mode, so that the processing goes to step SD2. For example, if the cursor is positioned to a desired artist name in the displayed keyword list and the set switch is pressed, the following processing is performed.

In step SD2, the song tables (FIGS. 6 and 9) are searched for songs matching the keyword pointed by the address pointer in the keyword table (FIG. 7(A) to FIG. 7(C). For example, if artist number 1 is selected, the song codes and song titles having the artist number 1 are searched for. In step SD3, all song codes and song titles found by the search are registered in the sort table (FIG. 13). Because only the song codes and song titles matching the keyword are registered, the song codes are generally registered in a discontinuous manner as shown in FIG. 13. In step SD4, the songs in the sort table are sorted in the order of song codes. Because the song codes are arranged in the alphabetical or Japanese 50 sounds order, the sort table lists the song titles in the alphabetical or Japanese 50 sounds order. In step SD5, the specified keyword is displayed on the display screen. For example, as shown in FIG. 3, message "Artist: Aaaa" is displayed at top of the display screen. Then, based on the sort table, the song list 30 (FIG. 3) is displayed with the song titles arranged in the alphabetical or Japanese 50 sounds order. In step SD6, in order to switch the keyword select mode to the song select mode, the flag KWD_MD is set to "0," upon which the set switch processing comes to an end.

If, in step SD1, the flag KWD_MD is found "0," it indicates the song select mode, so that the processing goes to step SD7. For example, if the cursor is positioned at a desired song title among the song titles shown on the display screen and the set switch is operated, the following processing is performed. In step SD7, music performance configuration data 38 corresponding to a song code pointed by the address pointer in the sort table is selected, and the selected music performance configuration data is read from the song table (FIG. 6 or FIG. 9). In step SD8, based on the read music performance configuration data, music performance environment is set in terms of accompaniment style, timbre, tempo, harmony, and so on. In step SD9, if the user conducts operation for correcting the music performance configuration data, the performance environment is set based on the corrected music performance configuration data. If the user is not satisfied with the music performance configuration data read from the song table, the user can correct the data by use of the value change switch (FIG. 4). Then, the set switch processing comes to an end.

Figure 17:
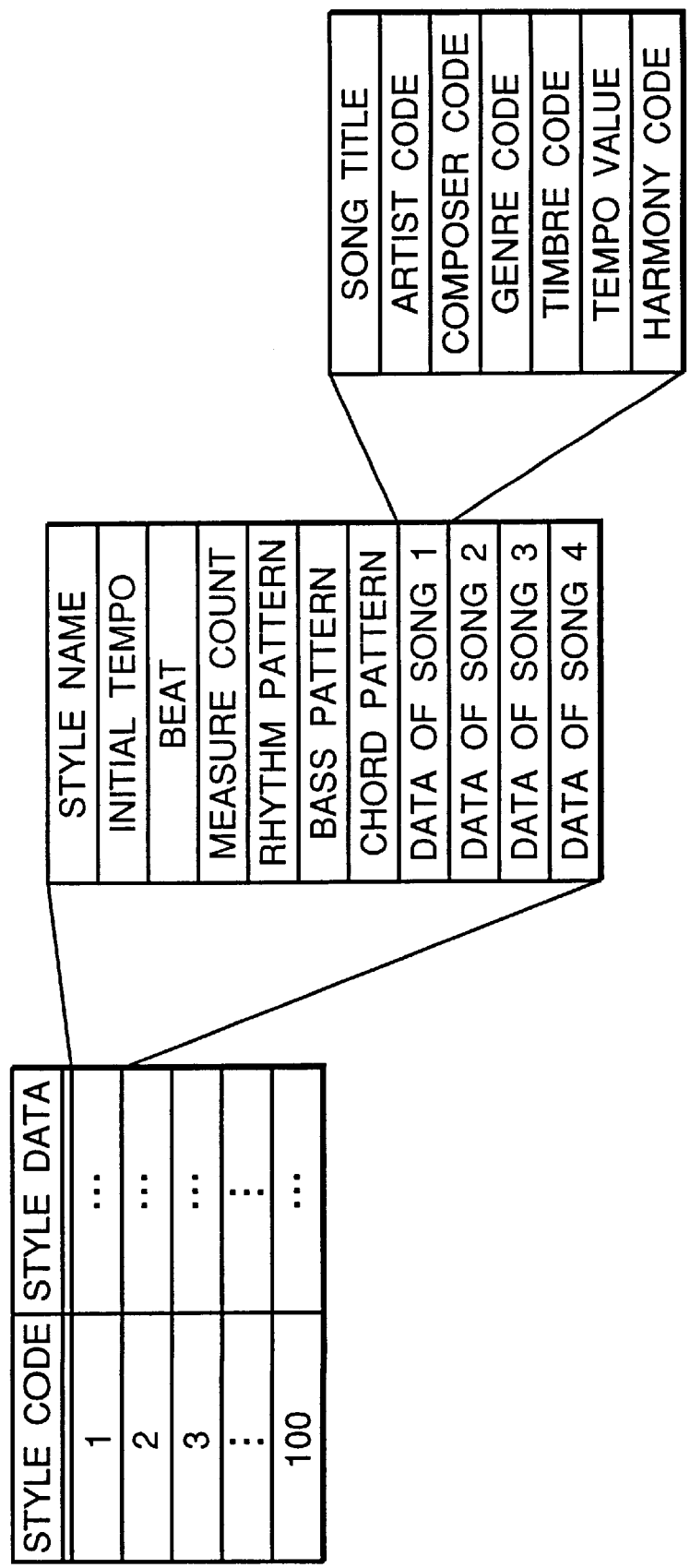
FIG. 17 is a diagram illustrating an example of constitution of another style data.

FIG. 17 shows an example of a format of the style data other than that shown in FIG. 8(A). Each of the style data is identified by a style code. The style data includes style name, initial tempo, beat, accompaniment repeat pattern measure count, rhythm pattern, bass pattern, and chord pattern in addition to song data. For example, in style code 1, if there are four songs that belong to the style code 1, the style data of the code 1 includes data of song 1, data of song 2, data of song 3, and data of song 4. Each song data includes song title, artist code, composer code, genre code, timbre code, tempo value, and harmony code. This allows keyword search based on artist code, composer code, and genre code. This also allows setting of the music performance configuration data in terms of various parameters such as timbre code. Because the style data includes song data, the song table shown in FIG. 6 is not required.

If the style data includes the song data, the style data can be subsequently supplemented with ease. If the style data shown in FIG. 8(A) is used rather than the style data shown in FIG. 17, it is not easy to add new style data. To add new style data, it is necessary to not only add new style data to the style data shown in FIG. 8(A) but also to register new style codes into the song table shown in FIG. 6 accordingly, thereby making the data creation cumbersome. On the contrary, according to the style data shown in FIG. 17, only new style data needs to be added without changing any other portions, facilitating the data creation. The additional style data can be supplied to the user in an external memory medium such as a floppy disk. In this case, the style data stored in the external memory medium can be easily added to the style data stored in the internal memory device by the method described with reference to FIG. 10.

Figure 18:
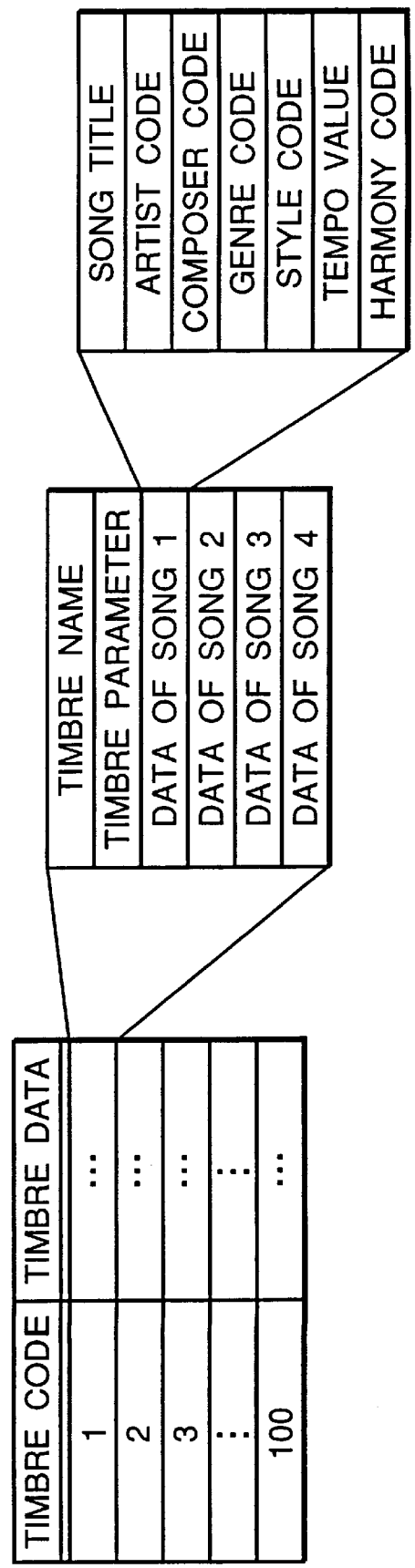
FIG. 18 is a diagram illustrating an example of constitution of another timbre data.

FIG. 18 shows an example of a format of timbre data other than the timbre data shown in FIG. 8(B). The items of the timbre data are identified by the timbre codes. The timbre data includes a timbre name, a timbre parameter, and song data. For example, if timbre code 1 is assigned to four songs, the timbre data of the code 1 includes data of song 1, data of song 2, data of song 3 and data of song 4. Each song data includes a title, an artist code, a composer code, a genre code, a style code, a tempo value, and a harmony code. This allows keyword search based on the artist code and so on, thereby making the song table shown in FIG. 6 unnecessary. If the timbre data includes the song data, the timbre data can be subsequently supplemented with ease. The timbre data stored in the external memory medium can be easily added to the timbre data stored in the internal memory device by the method described with reference to FIG. 10.

Figure 19:
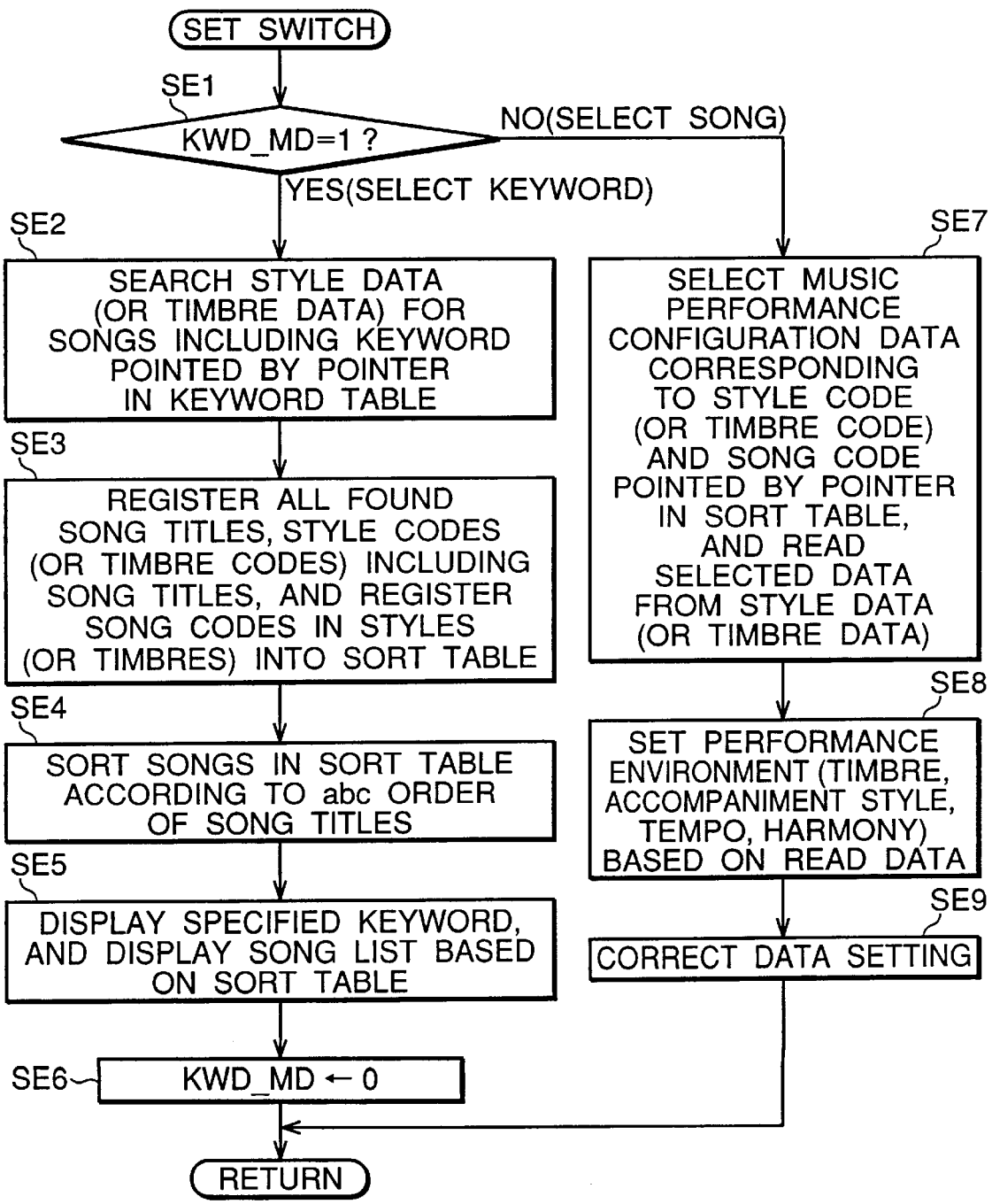
FIG. 19 is another flowchart for describing the processing to be performed by the CPU of the personal computer when the set switch is operated.

FIG. 19 is a flowchart for describing the processing to be performed by the CPU when the set switch is operated if the style data shown in FIG. 17 or the timbre data shown in FIG. 18 is used. In step SE1, it is determined whether the flag KWD_MD is "1" or not. When the flag KWD_MD is "1," it indicates the keyword select mode, so that the processing goes to step SE2. In step SE2, the style data (FIG. 17) or the timbre data (FIG. 18) is searched for a song that includes the keyword pointed by the address pointer in the keyword table (FIG. 7(A) to FIG. 7(C)). In step SE3, for all the song titles found in the search, the style code (or the timbre code)

including these song titles, and the song codes in the style (or the timbre) are registered in the sort table (FIG. 20). As shown in FIG. 20, in the sort table, the style codes, the song codes in the style, and the song titles are related with each other. In step SE4, the songs in the sort table are sorted in the alphabetical or Japanese 50 sounds order of music title. In step SE5, the specified keyword is displayed on the display screen. Then, based on the sort table, the song title list 30 (FIG. 3) is displayed with the song codes sorted in the alphabetical or Japanese 50 sounds order. In step SE6, in order to switch from the keyword select mode to the song select mode, the flag KWD_MD is set to "0," upon which the set switch processing comes to an end.

If, in step SE1, the flag KWD_MD is found "0," it indicates the song select mode, so that the processing goes to step SE7. In step SE7, the music performance configuration data corresponding to the song code and the style code (or the timbre code) pointed by the address pointer in the sort table is selected and read from the style data (FIG. 17) or the timbre data (FIG. 18). In step SE8, performance environment such as the timbre or the accompaniment style is set based on the read music performance configuration data. In step SE9, if the user conducts operation for correcting the music performance configuration data, the performance environment is set based on the corrected music performance configuration data. Then, the set switch processing comes to an end.

By selecting a song title itself, the data selecting apparatus can easily set the music performance configuration data adapted to the song to be performed. Namely, the data selecting apparatus can perform so-called song image setting. Further, searching by a keyword in terms of artist, composer, or genre allows selection of a desired song title easily and quickly. If a song to be performed is already determined, selecting the title of that song automatically sets the music performance configuration data suitable for that song. Therefore, the user is not necessary to select a specific accompaniment style for the selected song. If the user can recognize a song from its title, the user can grasp a fairly concrete image of the song, so that the user can readily select the desired song title. Further, music performance of the selected song expected by the user may normally well match with the music performance actually made according to the automatically set performance configuration data.

In addition to accompaniment style, timbre, and so on mentioned above, the music performance configuration data may include chord progression data, introduction pattern data, ending pattern data, effect data including reverberation, left-hand chord specification mode (single finger, finger chord, full keyboard, and so on) data, and volume data of melody part and accompaniment part. The keyword includes various terms other than artist name and so on mentioned above.

The data selecting apparatus according to the invention may be embodied by not only an electronic musical instrument but also combination of a personal computer and application software. The application software is supplied to the personal computer by means of a machine readable medium such as a magnetic disk, an optical disk or a semiconductor memory. Alternatively, the application software may be supplied to the personal computer via a network. Thus, the present invention covers a machine readable medium which is a particular type of the external memory medium 18 for use in the music apparatus having the CPU 11 for generating a music piece according to a desired data item selected from either of an internal memory device which memorizes a first set of data items and an external memory medium which is accessible by means of a peripheral device. The machine readable medium contains program instructions executable by the CPU 11 for causing the music apparatus to perform the steps of presenting a detection signal when the peripheral device receives the external memory medium for accessing and when the received external memory medium stores a second set of data items upon accessing, merging the first set of data items retrieved from the internal memory device and the second set of data items retrieved from the external memory medium with each other in response to the detection signal, sorting the merged data items in a predetermined order, displaying both of the first and second sets of the data items in the predetermined order upon presence of the detection signal, otherwise displaying only the first set of data items upon absence of the detection signal, selecting a desired data item from the displayed data items, and generating the music piece according to the selected dada item.

Preferably, the internal memory device has a permanent memory which memorizes the first set of data items and a temporary memory which is rewritable with data items. In such a case, the steps performed by the music apparatus further comprise loading the first set of data items into the temporary memory from the permanent memory, and loading the second set of data items into the temporary memory from the external memory medium so that the first and second sets of data items are merged and sorted in the temporary memory. The steps further comprise presenting a further detection signal when the temporary memory is already written with a third set of data items, loading the second set of data items into the temporary memory from the external memory medium in response to the further detection signal so as to overwrite the third set of data items when the second set of data items is different than the third set of data items, and otherwise stopping the loading of the second set of data items when the second set of data items is identical to the third set of data items.

Preferably, the steps performed by the music apparatus include inputting a keyword associative of a desired data item prior to selection of the desired data item, searching the sorted data items in accordance with the inputted keyword to identify data items matching the keyword, and exclusively displaying the identified data items to facilitate selection of the desired data item.

The data selecting apparatus according to the invention is incorporated in an electronic musical instrument along with a tone generator and an automatic performance apparatus. Alternatively, the data selecting apparatus may be independently connected to these apparatuses by use of communication means such as a MIDI or various networks. Further, the data selecting apparatus according to the invention is also applicable to stringed instruments, wind instruments, and percussion instruments in addition to keyboard instruments.

As described and according to the invention, even if the user does not know which of the internal memory device and the external memory medium stores desired data, the user can select the desired data properly, thereby enhancing ease of use. If the same data as that stored in the external memory medium is already stored in the internal memory device, the duplicate data is not reloaded into the internal memory device, thereby reducing the time in which the user must wait for next operation.

While the preferred embodiments of the present invention have been described using specific terms, such description is for illustrative purposes only, and it is to be understood that changes and variations may be made without departing from the spirit or scope of the appended claims.

What is claimed is:

1. An apparatus for selecting a desired data item comprising:
   an internal memory device that memorizes a first set of data items;
   a peripheral device that is provided for accessing an external memory medium;
   a detector device that presents a detection signal when the peripheral device receives the external memory medium for accessing and when the received external memory medium stores a second set of data items upon accessing;
   a controller device that responds to the detection signal for merging the first set of data items retrieved from the internal memory device and the second set of data items retrieved from the external memory medium with each other and for sorting the merged data items in a predetermined order;
   a display device that operates upon presence of the detection signal for displaying both of the first and second sets of the data items in the predetermined order, and that operates upon absence of the detection signal for displaying only the first set of data items; and
   a selector device that selects a desired data item from the displayed data items.

2. An apparatus according to claim 1, wherein the internal memory device has a permanent memory that memorizes the first set of data items and a temporary memory that is rewritable with data items, and wherein the controller device loads the first set of data items into the temporary memory from the permanent memory and loads the second set of data items into the temporary memory from the external memory medium so that the first and second sets of data items are merged and sorted in the temporary memory.

3. An apparatus according to claim 2, wherein the permanent memory comprises a read only memory, and the temporary memory comprises a random access memory.

4. An apparatus according to claim 2, wherein the detector device presents a further detection signal when the temporary memory is already written with a third set of data items, and wherein the controller device responds to the further detection signal for loading the second set of data items into the temporary memory from the external memory medium to overwrite the third set of data items when the second set of data items is different than the third set of data items, and otherwise for stopping the loading of the second set of data items when the second set of data items is identical to the third set of data items.

5. An apparatus according to claim 1, wherein the selector device inputs a keyword associative of a desired data item prior to selection of the desired data item, wherein the controller device searches the sorted data items in accordance with the inputted keyword to identify data items matching the keyword, and wherein the display device exclusively displays the identified data items to facilitate selection of the desired data item.

6. A music apparatus for generating a music piece according to a music data item comprising:
   internal memory means for memorizing a first group of music data items;
   drive means provided for accessing an external memory medium;
   detector means for presenting a detection signal when the drive means receives the external memory medium for accessing and when the received external memory medium stores a second group of music data items upon accessing;
   controller means responsive to the detection signal for merging the first group of music data items retrieved from the internal memory means and the second group of music data items retrieved from the external memory medium with each other and for sorting the merged music data items in a predetermined order;
   display means operative upon presence of the detection signal for displaying both of the first and second groups of the music data items in the predetermined order, and being operative upon absence of the detection signal for displaying only the first group of music data items;
   selector means for selecting a desired music data item from the displayed music data items; and
   generator means for generating the music piece according to the selected music data item.

7. A music apparatus according to claim 6, wherein the internal memory means comprises a permanent memory which memorizes the first group of music data items and a temporary memory which is rewritable with music data items, and wherein the controller means comprises means for loading the first group of music data items into the temporary memory from the permanent memory, and means for loading the second group of music data items into the temporary memory from the external memory medium so that the first and second groups of music data items are merged and sorted in the temporary memory.

8. A music apparatus according to claim 7, wherein the permanent memory comprises a read only memory, and the temporary memory comprises a random access memory.

9. A music apparatus according to claim 7, wherein the detector means comprises means for presenting a further detection signal when the temporary memory is already written with a third group of music data items, and wherein the controller means comprises means responsive to the further detection signal for loading the second group of music data items into the temporary memory from the external memory medium to overwrite the third group of music data items when the second group of music data items is different than the third group of music data items, and otherwise for stopping the loading of the second group of music data items when the second group of music data items is identical to the third group of music data items.

10. A music apparatus according to claim 6, wherein the selector means comprises means for inputting a keyword associative of a desired music data item prior to selection of the desired music data item, wherein the controller means comprises means for searching the sorted music data items in accordance with the inputted keyword to identify music data items matching the keyword, and wherein the display means comprises means for exclusively displaying the identified music data items to facilitate selection of the desired music data item.

11. A method of selecting a desired data item from either of an internal memory device which memorizes a first set of data items and an external memory medium which is accessible by means of a peripheral device, the method comprising the steps of:
   presenting a detection signal when the peripheral device receives the external memory medium for accessing and when the received external memory medium stores a second set of data items upon accessing;
   merging the first set of data items retrieved from the internal memory device and the second set of data items retrieved from the external memory medium with each other in response to the detection signal;

sorting the merged data items in a predetermined order;

displaying both of the first and second sets of the data items in the predetermined order upon presence of the detection signal;

otherwise displaying only the first set of data items upon absence of the detection signal; and selecting a desired data item from the displayed data items.

12. A method according to claim 11, wherein the internal memory device has a permanent memory which memorizes the first set of data items and a temporary memory which is rewritable with data items, further comprising the steps of loading the first set of data items into the temporary memory from the permanent memory and loading the second set of data items into the temporary memory from the external memory medium so that the first and second sets of data items are merged and sorted in the temporary memory.

13. A method according to claim 12, further comprising the steps of presenting a further detection signal when the temporary memory is already written with a third set of data items, loading the second set of data items into the temporary memory from the external memory medium in response to the further detection signal so as to overwrite the third set of data items when the second set of data items is different than the third set of data items, and otherwise stopping the loading of the second set of data items when the second set of data items is identical to the third set of data items.

14. A method according to claim 11, further comprising the steps of inputting a keyword associative of a desired data item prior to selection of the desired data item, searching the sorted data items in accordance with the inputted keyword to identify data items matching the keyword, and exclusively displaying the identified data items to facilitate selection of the desired data item.

15. A machine readable medium for use in a music apparatus having a CPU for generating a music piece according to a desired data item selected from either of an internal memory device which memorizes a first set of data items and an external memory medium which is accessible by means of a peripheral device, the machine readable medium containing program instructions executable by the CPU for causing the music apparatus to perform the steps of:

presenting a detection signal when the peripheral device receives the external memory medium for accessing and when the received external memory medium stores a second set of data items upon accessing;

merging the first set of data items retrieved from the internal memory device and the second set of data items retrieved from the external memory medium with each other in response to the detection signal;

sorting the merged data items in a predetermined order;

displaying both of the first and second sets of the data items in the predetermined order upon presence of the detection signal;

otherwise displaying only the first set of data items upon absence of the detection signal;

selecting a desired data item from the displayed data items; and generating the music piece according to the selected dada item.

16. A machine readable medium according to claim 15, wherein the internal memory device has a permanent memory which memorizes the first set of data items and a temporary memory which is rewritable with data items, and wherein the steps further comprise loading the first set of data items into the temporary memory from the permanent memory and loading the second set of data items into the temporary memory from the external memory medium so that the first and second sets of data items are merged and sorted in the temporary memory.

17. A machine readable medium according to claim 16, wherein the steps further comprise presenting a further detection signal when the temporary memory is already written with a third set of data items, loading the second set of data items into the temporary memory from the external memory medium in response to the further detection signal so as to overwrite the third set of data items when the second set of data items is different than the third set of data items, and otherwise stopping the loading of the second set of data items when the second set of data items is identical to the third set of data items.

18. A machine readable medium according to claim 15, wherein the steps further comprise inputting a keyword associative of a desired data item prior to selection of the desired data item, searching the sorted data items in accordance with the inputted keyword to identify data items matching the keyword, and exclusively displaying the identified data items to facilitate selection of the desired data item.

* * * * *